Aug. 24, 1965        KAZUO GOTOH           3,201,862
        PROCESS FOR MAKING STEEL-REINFORCED ALUMINUM MEMBERS
Filed Dec. 26, 1961
2 Sheets-Sheet 1
Fig. 1
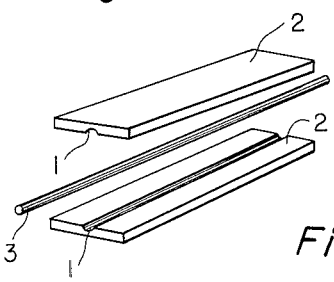
Fig. 3
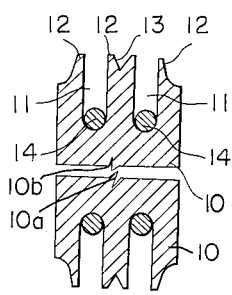
Fig. 2
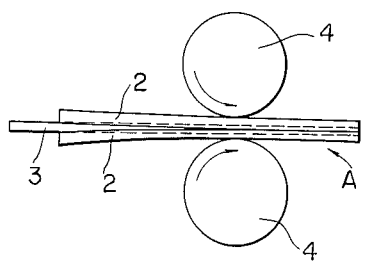
Fig. 4
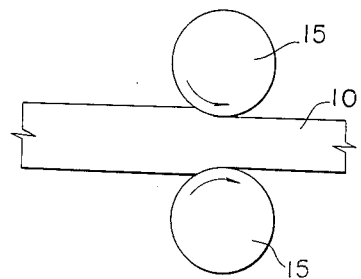
Fig. 7
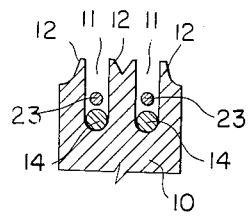
Fig. 5   Fig. 6
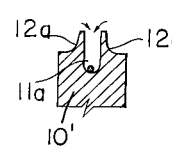 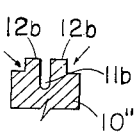
Fig. 8
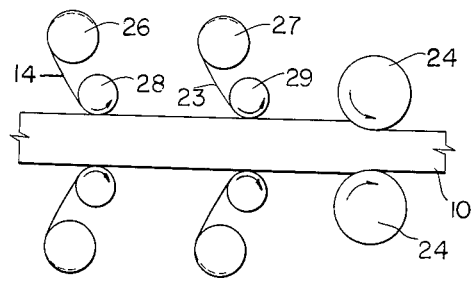
INVENTOR.
KAZUO GOTOH
BY Aug. 24, 1965 KAZUO GOTOH 3,201,862
PROCESS FOR MAKING STEEL-REINFORCED ALUMINUM MEMBERS
Filed Dec. 26, 1961 2 Sheets-Sheet 2

INVENTOR.
KAZUO GOTOH
BY

United States Patent Office 3,201,862
Patented Aug. 24, 1965

3,201,862
PROCESS FOR MAKING STEEL-REINFORCED
ALUMINUM MEMBERS
Kazuo Gotoh, 10-Ro-3, Nishikata-machi, Bunkyo-ku,
Tokyo, Japan
Filed Dec. 26, 1961, Ser. No. 161,908
Claims priority, application Japan, Dec. 28, 1960,
35/5,097
15 Claims. (Cl. 29—470.1)

This invention relates to the manufacture of composite structural members, and particularly to a method of making an aluminum member reinforced with piano wire.

For equal volume, aluminum has about the same weight as cement and about ten times the strength of cement. Steelwire-reinforced aluminum has many of the known advantages of reinforced concrete. The aluminum, moreover, protects the steel against corrosion. Suitable grades of steel and aluminum alloys can readily be matched in such a manner that the ratio between the tensile strength and Young's modulus of the wire be approximately equal to the corresponding ratio of the aluminum component as is necessary in a composite structure of the type discussed.

The object of the invention is the provision of a process for making a steel wire reinforced aluminum member.

A more specific object is the provision of steel wire reinforced aluminum members which are suitable for structural use.

With these and other objects in view, the process of the invention includes the step of forming a member of aluminum base material with a groove which is elongated in a predetermined direction. A steel wire is placed in the groove, and pressure is applied to a portion of the aluminum base material adjacent the groove in such a manner as to force the material into the groove and about the wire, whereby the material is bonded to the wire. The member of aluminum base material is stretched in the afore-mentioned direction while bonded to the wire, whereby the wire is also stretched.

Other features of the invention and many of the attendant advantages will be readily appreciated from the following description of preferred embodiments when considered with the annexed drawing in which:

FIG. 1 shows the component parts of a first reinforced structural member of the invention in perspective view;

FIG. 2 shows a rolling arrangement for combining the component parts illustrated in FIG. 1, the view being in fragmentary side elevation;

FIG. 3 shows the partly assembled component parts of another reinforced structural member of the invention in cross section;

FIG. 4 shows a rolling arrangement for making a structural member of the invention from the component parts of FIG. 3, the view being analogous to that of FIG. 2;

Figure 9:
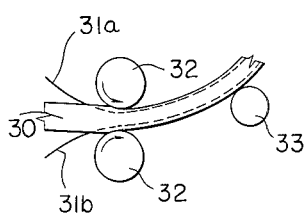
Figure 10:
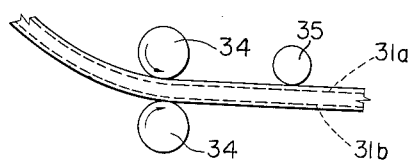
Figure 11:
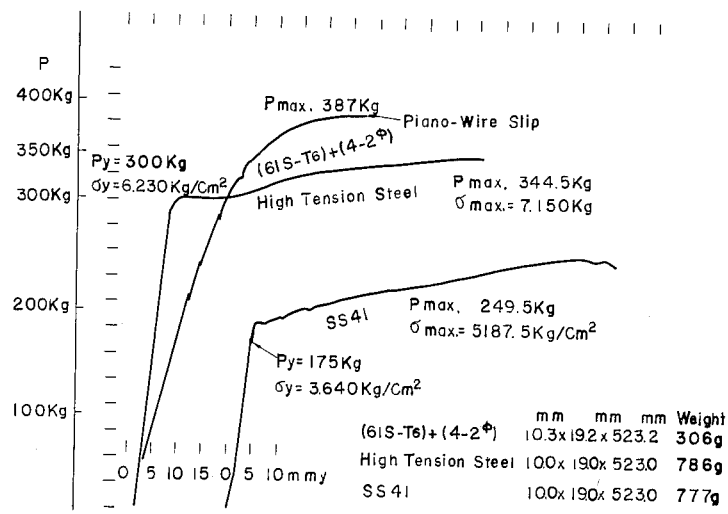
Figure 11:
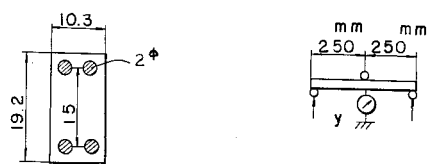

FIGS. 5, 6, and 7 show modified component parts for reinforced members of the invention in fragmentary views corresponding to that of FIG. 3;

FIG. 8 illustrates a rolling arrangement for combining the components of FIG. 7, the view corresponding to those of FIGS. 2 and 4;

FIG. 9 shows a modified rolling arrangement for preparing an arcuately bent reinforced member of the invention;

FIG. 10 illustrates a rolling arrangement for straightening the member produced as shown in FIG. 9;

FIG. 11 is a bending stress-strain diagram of a steel wire reinforced aluminum member of the invention including comparison data for two types of steel.

Referring now to the drawing in detail, and initially to FIG. 1, there are seen two flat elongated bars 2 of aluminum base material having longitudinal grooves 1 of U-shaped cross-section in respective opposite faces. The bars 2 are to be assembled with a piano wire 3.

When the grooved faces of the bars 2 are superimposed, as shown in FIG. 2, there is formed an elongated duct of a circular cross section initially greater than that of the wire 3 which is inserted in the duct. The superimposed bars 2 with the wire 3 inserted therebetween are passed between two rolls 4, thereby reducing the cross section of the bars and of the duct. The aluminum is pressure-bonded to the steel wire, and the bonded assembly is stretched by passage between the rolls.

The most favorable results are obtained if the initial diameter D of the duct formed by the two grooves 1, the diameter d of the piano wire, and the reduction R of the aluminum base material between the rolls 4 are related by the following formulas:

$$0.01 < \frac{\frac{d}{D} \times 100}{(100-R)^2} < 0.03$$

$$0.022 < \frac{\frac{D^2-d^2}{D^2} \times 100}{R^2} < 0.05$$

It will be appreciated that three or more grooved aluminum base bars may be combined with interposed steel wires in a manner evident from FIGS. 1 and 2.

FIG. 3 shows the component parts for another reinforced member of the invention prior to passage between rolls 15 as shown in FIG. 4. Each member 10 has a longitudinal rib 10a and a groove 10b in an otherwise flat face for engagement with the groove and rib on a corresponding face of the other member 10, whereby the members 10 are secured against lateral displacement when the flat faces are superimposed.

Each member 10 has a pair of deep parallel longitudinal grooves 11 which are open in a direction away from the other member 10. Ribs 12 flank the two sides of each groove 11 and taper in a direction outward of the associated groove. The ribs 12 located between the grooves 11 of each pair define a shallow V-shaped groove 13 therebetween. The wires 14 are respectively received in the grooves 11.

When the assembly shown in FIG. 3 is passed between the rolls 15, the material of the ribs 12 is forced into the grooves 11 to fill the same, and thereby to bond the piano wires to the aluminum base material.

One half of a modified assembly is shown in each of FIGS. 5, 6, and 7. The member 10' shown in FIG. 5 has but a single groove 11a and therefor only a single pair of flanking ribs 12a of a shape similar to that of the ribs 12 in FIG. 3. The ribs 12a are mainly bent into the groove 11a during rolling, as indicated by curved arrows.

The aluminum base member 10'' shown in FIG. 7 has a groove 11b flanked by two ribs 12b of rectangular cross section which slip diagonally into the groove 11b under the pressure of the rolls, as indicated by straight arrows.

The member 10'' is more easily prepared than the member 10', but it requires higher rolling pressure which may cause deformation of the basic shape, and voids may form in the rolled material.

FIG. 7 shows yet another assembly in which an aluminum wire 23 is superposed on the piano wire 14 in each groove 11 of an aluminum base member 10 identical with that shown in FIG. 3. The aluminum wire 23 helps in filling the groove 11 during the subsequent rolling operation.

An arrangement for continuously inserting the wires 14 and 23 in the grooves of superimposed aluminum base members 10, and for continuously rolling the assembly formed by the insertion of the wires into a unitary reinforced structural member is shown in FIG. 8. The aluminum base members 10 are fed to pressure rolls 24, between pairs of guide rolls 28, 29. Steel wire 14 is drawn from reels 26 over the guide rolls 28 into the grooves of the moving aluminum base elements, and aluminum wire is deposited on the steel wire after being drawn from reels 27 over the guide rolls 29.

The embedded piano wire is prestressed in tension during the rolling operation in each of the processes illustrated in FIGS. 2, 4, and 8. If so desired, the wires embedded on one side of the composite structures formed in the processes illustrated in FIGS. 4 and 8 may also be stressed in tension whereas the others are stressed in compression. Suitable arrangements are illustrated in FIGS. 9 and 10.

As shown in FIG. 9, steel wires 31a and 31b are embedded in corresponding grooves in opposite faces of an aluminum base material member 30 in a manner obvious from FIG. 8. The assembly is passed between pressure rolls 32, and thereby stretched. Upon emerging from the nip of the rolls 32, the unitary reinforced member obtained is bent arcuately by passage over a guide roll 33. The deformation of the reinforced member causes the steel wire 31a on the concave side of the member to be compressed, whereas the wire 31b on the convex side is further tensioned.

When the arcuately bent reinforced member is next passed between two rolls 34 under pressure, as shown in FIG. 10, and thereafter straightened by passage over a guide roll 35, the stress relationship is reversed, the wire 31b now being stressed in compression, and the wire 31a being tensioned.

It has been found that better results are obtained with zinc plated piano wire than with bare wire. Improvement also has been achieved by heat treating the reinforced members at 200° to 250° C. Processing is facilitated, if the aluminum base members are heated to about 200° C. (150° to 350° C.) prior to assembly with the piano wire. The process of the invention involves deformation of the aluminum base material by rolling only. It is possible, therefore, to use aluminum materials of low elongation, for example, in the H or T-6 tempers.

Typical properties of a structural member of the invention are illustrated in FIG. 11 which shows the results of bending tests performed on bars approximately 1 cm. thick, 2 cm. wide, and centrally loaded between supports spaced approximately 50 cm. apart. The three samples tested consisted respectively of mild structural steel (Japanese Industrial Standard SS41), high strength steel (J.I.S. SS71), and aluminum alloy 6061-T$_6$ reinforced with four piano wires of 2 mm. diameter.

The weight of the reinforced aluminum bar was only 40% of the weight of the steel bars, but its ultimate bending strength was better than that of the high strength steel SS71, and more than twice that of the mild steel SS41. Its rigidity was much higher than that of conventional aluminum alloys, including such alloys as 7075-T$_6$. The Young modulus of the reinforce aluminum material was 8,000 kg./mm.$^2$ as compared to 7,300 kg./mm.$^2$ for aluminum alloy 7075-T$_6$.

While the invention has been described with reference to specific embodiments, it is to be understood that it is not limited thereto, but that many changes and modifications may be made without departing from the scope and spirit of the invention as set forth in the appended claims.

What I claim is:

1. A process of making a reinforced aluminum member which comprises:
   (a) forming a member of aluminum base material with a groove elongated in a predetermined direction;
   (b) placing a steel wire member in said groove;
   (c) applying pressure to a portion of said aluminum base material adjacent said groove in such a manner as to force said material portion into said groove and about said wire member, whereby said material is bonded to said wire member and
   (d) stretching the member of aluminum base material in said predetermined direction while bonded to said wire member, whereby said wire member is stretched.

2. A process of making a reinforced aluminum member which comprises:
   (a) forming a member of aluminum base material with a groove extending in a predetermined direction;
   (b) securing a portion of a steel wire member in said groove;
   (c) passing said member of aluminum base material in said predetermined direction between two rolls under a pressure sufficient to force a portion of said material into said groove and into bonding engagement with the steel wire portion therein while continuously inserting other portions of said steel wire member in said groove; and
   (d) simultaneously deforming said members in said predetermined direction while the same pass between said rolls.

3. A process of making a reinforced aluminum member which comprises:
   (a) forming a member of aluminum base material with a groove extending in a predetermined direction;
   (b) placing a steel wire member in said groove;
   (c) substantially filling the remainder of said groove with aluminum base material under pressure sufficient to bond said steel wire member to said member of aluminum base material; and
   (d) simultaneously stretching said members in said predetermined direction.

4. A process as set forth in claim 3, wherein said member of aluminum base material is passed between two rolls under pressure to stretch the same while said steel wire member is bonded thereby by the aluminum base material filling said remainder of said groove.

5. A process as set forth in claim 4, wherein said remainder of said groove is filled with a portion of the aluminum base material of said member of said material by passage between said two rolls.

6. A process of making a reinforced aluminum member which comprises:
   (a) forming two members of aluminum base material with respective elongated open grooves;
   (b) superimposing said members in such a manner that said grooves are elongated in a common predetermined direction, and the open sides thereof face in opposite directions transverse of said predetermined direction;
   (c) passing the superimposed members between two rolls under pressure while simultaneously introducing a steel wire in each of said grooves, the pressure of said rolls being sufficient to force a portion of said material into said grooves to bond said material to the wire contained therein, and to bond the superimposed members to each other, and
   (d) simultaneously deforming said superimposed members and the bonded wires in said predetermined direction.

7. A process as set forth in claim 6, wherein at least one of said members and one of said wires are deformed in tension.

8. A process as set forth in claim 7, wherein said pressure is sufficient circumferentially to confine said wires in said portion of said material, and th eother member and the other wires are deformed in compression.

9. A process as set forth in claim 6, which further comprises forming one of said two members with another groove elongated in the direction of elongation of said first mentioned groove of said one member, and forming the other member with a projection elongated in the direction of elongation of the groove of said other member, said projection being engaged in said other groove of said one member when said members are superimposed.

10. A process of making a reinforced aluminum member which comprises:
   (a) passing a member of aluminum base material between two rollers under pressure in a predetermined direction, said member being formed with a groove elongated in said direction;
   (b) continuously feeding a steel wire to said groove for passage with said member between said rolls, the pressure of said rolls being sufficient to move a portion of said material into said groove into bonding engagement with said steel wire; and
   (c) simultaneously deforming said member and said wire, while said wire is bonded to said member.

11. A process as set forth in claim 10, wherein said member is being bent arcuately and said wire is simultaneously stressed in tension during said deforming.

12. A process as set forth in claim 10, wherein said pressure is sufficient circumferentially to confine said wire in said portion of said material, and said member, and the wire confined therein are deformed arcuately.

13. A process as set forth in claim 10, wherein another wire of aluminum base material is continuously fed to said groove with said steel wire for passage therewith and with said member between said rolls, whereby the aluminum base material of said member is bonded to the aluminum base material of said other wire.

14. A process as set forth in claim 10, wherein said deforming includes arcuately bending said member after passage between said rolls, and thereafter straightening the arcuately bent member.

15. A process as set forth in claim 10, further comprising heating said member and the wire bonded thereto to a temperature between 150° C. and 250° C.

References Cited by the Examiner

UNITED STATES PATENTS

| | | | |
|---|---|---|---|
| 246,407 | 8/81 | McTighe | 29—470.1 X |
| 2,607,109 | 8/52 | Reynolds. | |
| 2,763,058 | 9/56 | McCullough et al. | 29—498 X |
| 2,875,312 | 2/59 | Norton. | |
| 2,887,762 | 5/59 | Dobell | 29—452 X |
| 2,987,814 | 6/61 | Singleton et al. | 29—504 X |
| 3,007,284 | 11/61 | Dorland | 50—523 X |
| 3,040,780 | 6/62 | Sirois | 29—509 X |
| 3,041,719 | 7/62 | Haseltine | 29—470.5 X |
| 3,154,846 | 11/64 | Alexander | 29—470.5 |

FOREIGN PATENTS 452,126   5/35   Great Britain.

JOHN F. CAMPBELL, *Primary Examiner.*